United States Patent [19]

Udelhofen et al.

[11] Patent Number: 5,158,001
[45] Date of Patent: Oct. 27, 1992

[54] POWER TABLE TOOL ASSEMBLIES WITH DUST COLLECTION SYSTEM

[75] Inventors: Patrick J. Udelhofen, Chicago; Gary Polk, Hawthorn Woods, both of Ill.

[73] Assignee: Skil Corporation, Chicago, Ill.

[21] Appl. No.: 742,911

[22] Filed: Aug. 9, 1991

[51] Int. Cl.[5] .......................... B27B 5/24; B27B 5/29
[52] U.S. Cl. ........................................ 83/100; 83/168; 83/860; 83/DIG. 1; 83/447.1; 83/477.2; 51/273; 144/252 A
[58] Field of Search .............. 83/100, 168, 169, 471.3, 83/167, 860, DIG. 1, 477.1, 477.2; 29/DIG. 64; 51/273; 144/252 A, 252 R

[56] References Cited

U.S. PATENT DOCUMENTS 3,322,169  5/1967  Hilliard ..................... 144/252 R X
4,367,665  1/1983  Terpstra et al. ..................... 83/100

Primary Examiner—Frank T. Yost
Assistant Examiner—Raymond D. Woods
Attorney, Agent, or Firm—Jones, Day, Reavis & Pogue

[57] ABSTRACT

A power table tool having an outlet port positioned relative to the cutting member of the tool so that the dust and other debris generated by the cutting member can be removed from the interior of the tool assembly through an exhaust system. A guard member is provided for the outlet port to prevent insertion of extraneous matter into the interior of the tool as well as to protect the outlet from clogging as a result of the removal of the sawdust and other debris from the interior. The guard member is structured in a manner such that the area of the openings presented in the guard member is greater than about 100% of the area of the outlet port itself. The port is specifically aligned relative to the cutting member in order to enhance the removal of the sawdust and debris from the interior of the tool.

9 Claims, 3 Drawing Sheets

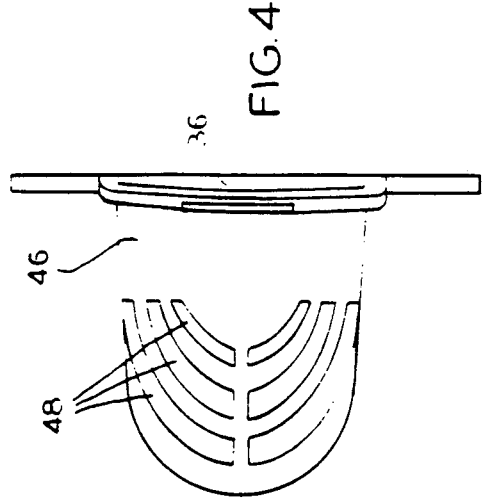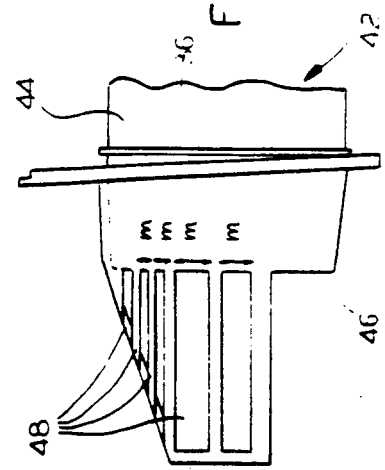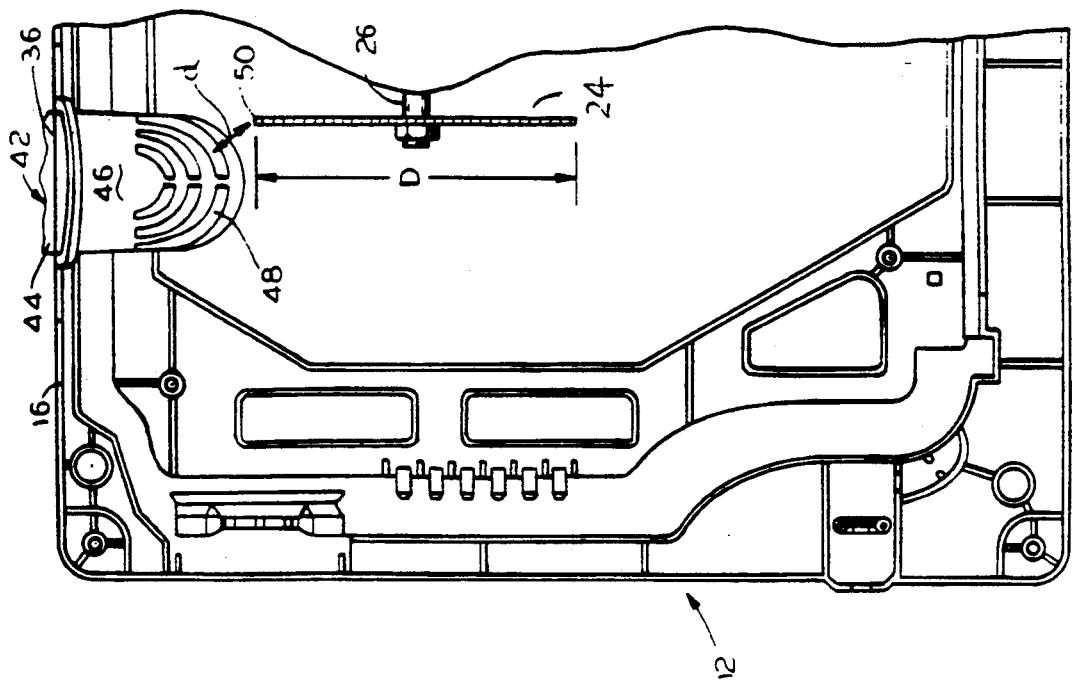

POWER TABLE TOOL ASSEMBLIES WITH DUST COLLECTION SYSTEM

BACKGROUND OF THE INVENTION

This invention relates generally to power table tools such as power table saws having an adjustable cutting member such as a saw blade rotatably mounted thereon. More particularly, it relates to power table tool assemblies constructed to enable collection of the dust, chips and other debris resulting from the use of the tools.

Although this invention is primarily directed to table saws, it should be noted that it is likewise applicable to any power table tools such as dadoes, sanders, grinders, shapers and other such tools and devices having rotatable cutting members which operate in a manner such that sawdust, wood chips and other such debris is directed from the surface of the cutting member and is expelled to the ambient atmosphere surrounding the power tool.

Dust confining and collecting housings and enclosures as well as other dust collection systems for power table saws and similar power cutting tools have been disclosed heretofore. Examples thereof may be found in U.S. Pat. Nos. 922,840; 1,789,569; 2,044,481; 3,007,501; 3,339,597; 3,945,281; 3,958,474; 4,063,478; 4,144,781; 4,253,362; 4,255,995; 4,326,864; 4,675,999; 4,742,743; 4,825,140 and 4,875,398.

However, none of the prior constructions or systems have adequately satisfied the user's requirements for an assembly which will prevent escape of the dust and chips from the tool housing into the atmosphere surrounding the tool. It has been a continuing problem to provide an assembly which will enable effective removal of the cutting debris without allowing it to be disseminated to the atmosphere, particularly after such assembly has been in use for a considerable period during which time substantial quantities of dust or chips have been generated. Furthermore, it has been recognized that this problem is particularly troublesome in regard to power tools having cutting members which are angularly adjustable relative to a work table since the angular movement of such members causes problems in designing housings which will enable the dust and chips to be collected within the confines of the tool and effectively disposed of exterior thereto.

SUMMARY OF THE INVENTION

In response to the above-noted shortcomings of the prior art, the present invention has been developed. The invention consists of a power table tool such as a power table saw having a rotating cylindrical cutting member such as a saw blade positioned relative to an outlet port in a manner such that the dust and debris generated by operation of the cutting member is collected and disposed of in an efficient and effective manner.

In particular, the outlet port is formed in a lower section of a rear housing wall in close proximity to the rotating cutting member so that the outlet is positioned advantageously to receive the refuse expelled in a generally tangential direction from the lower peripheral extremity of the cutting member.

A guard member projects inwardly from the inlet port into the housing to protect external parts such as the operator's fingers and other appendages and, in accordance with Underwriters Laboratories Inc. published standards UL 987 28.4–28.7, provides sufficiently complete protection from the rotating member from the standpoint of number and size of openings as well as from the standpoint of the minor dimension of the openings in the guard as a function of the minimum straight line distance of the openings to the rotating member. Furthermore, the guard member has sufficient open area to assure continued effective collection of dust and other debris during operation of the cutting member without encountering undesired clogging. Specifically, the total area of the openings in the guard is at least as large as the area of the outlet port itself and, preferably, is greater than about 125% of the outlet port area and, most preferably, is greater than about 150% of the area of the port.

In a preferred embodiment of the present invention, the power tool is a power saw and the cutting member is a 10 inch diameter saw blade which is interchangeably mounted in an angularly adjustable manner in the housing. The angular displacement of the blade relative to the work surface of the tool is known as the bevel adjustment angle and in the present devices ranges from 90 degrees to 45 degrees. The projection of this angular bevel adjustment range of the blade onto the rear wall of the housing is employed to define the longitudinal placement of the outlet port in the rear wall. Furthermore, an imaginary tangential plane projecting from the lower periphery of the 10 inch diameter cutting member to the rear wall of the housing essentially parallel to a planar work surface atop the housing is employed to position the outlet port in a manner such that the longitudinal midline of the port lies on or below this tangential plane. In the preferred embodiment, the openings are round or spherical in lateral section in order to prevent flat chips emitted by the cutting member from blocking air flow through the grates of the guard member. Also, in the preferred embodiment, a detachable structure containing the outlet port is affixed to the housing so that the port structure can be disassembled from the housing without removing the entire table saw from a supporting bench or table.

Accordingly, it is a general object of the present invention to provide power table tools including improved dust collection systems.

Another object is to provide a power table tool in which the outlet port through which debris from within the tool housing can be exhausted is positioned in an advantageous position relative to the cutting member so as to enable effective and efficient removal of the debris from the interior of the device.

A further object is to provide a power table tool having a guard member positioned about the outlet port in a manner such as to enable compliance with applicable Underwriters Laboratories Inc. standards while providing sufficient open area to enable removal of debris through the port without encountering clogging problems.

Other objects of this invention, in addition to those set forth above, will become apparent to one of ordinary skill in the art from the following description.

BRIEF DESCRIPTION OF THE DRAWINGS

FIG. 2 is a fragmentary, more or less schematic illustration in top plan of a housing of the power table saw of FIG. 1 with the work surface removed to depict the relative horizontal positioning of a saw blade of the device and a guard member surrounding an outlet port with an exhaust pipe affixed thereto;

FIG. 4 is a top plan view of the guard member of FIGS. 2 and 3; and

FIG. 5 is a side elevational view of the guard member of FIG. 4.

DETAILED DESCRIPTION OF THE INVENTION

Figure 1:
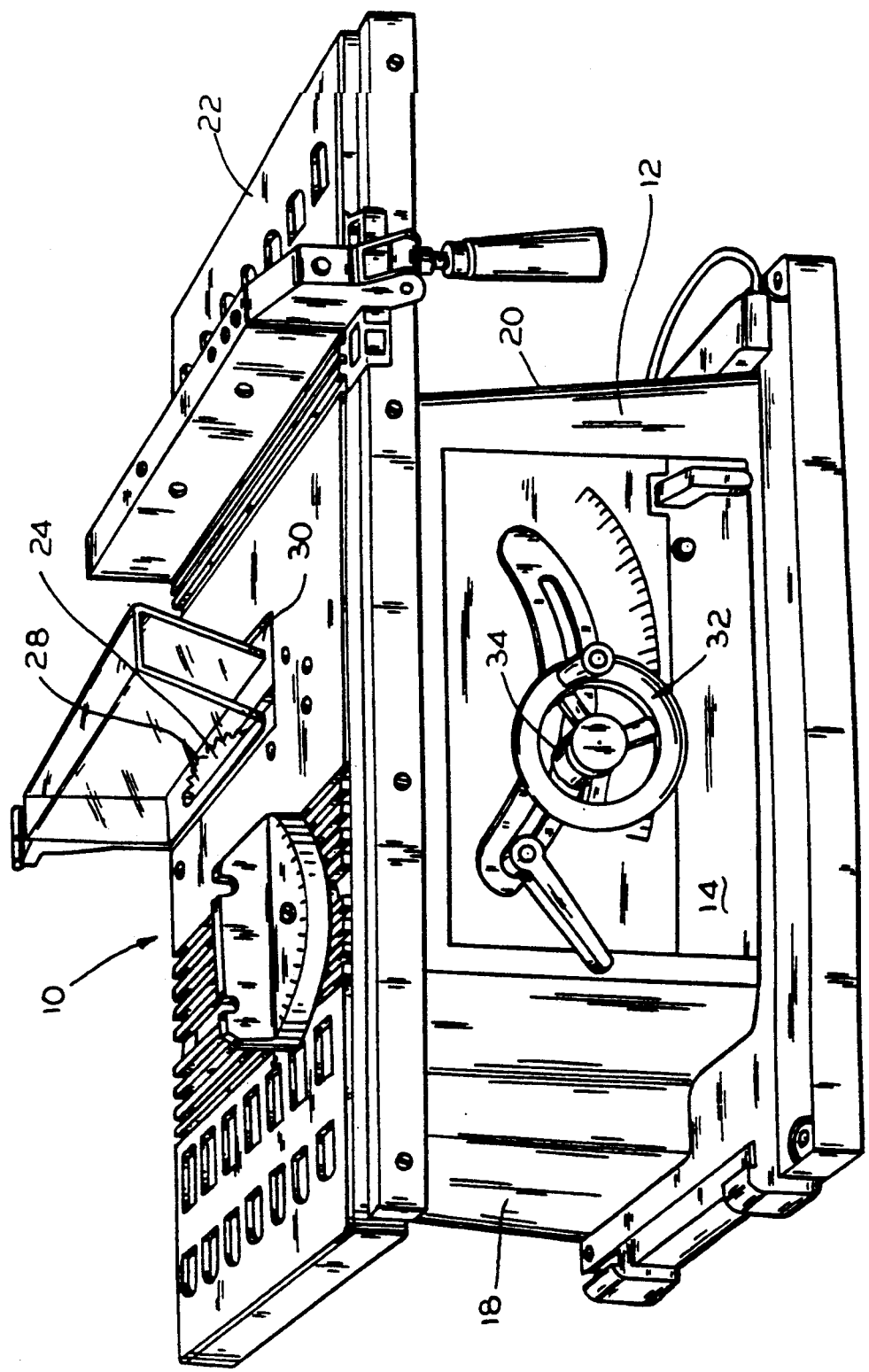
FIG. 1 is a perspective view of a power table saw in accordance with this invention.

FIG. 1 generally illustrates a power table saw 10 including a housing 12 having spaced front and rear walls 14 and 16, respectively, sealingly interconnected by spaced side walls 18 and 20. The housing 12 sealingly engages and supports a slotted, substantially planar work surface 22 on the upper extremity of the walls 14, 16, 18 and 20. A circular saw blade or cutting member 24 having a diameter D of up to about 10 inches is mounted for rotation on a rotatable shaft 26 within the housing beneath the planar work surface 22 via conventional bearing means (not shown) driven by a standard drive motor (not shown).

The blade 24 is positioned transverse to the front and rear walls 14 and 16 of the housing 12. The upper periphery 28 of the saw blade 24 projects outwardly from the interior of the housing 12 through a slot 30 in the slotted work surface 22 to engage a workpiece which may be positioned on the work surface 22. The blade 24 is mounted via a standard adjustment mechanism 32 including adjustment lever 34 and usual linkages (not shown) for selective angular displacement in the slot 30 in the work surface 22 so that the blade 24 will tilt with respect to the planar work surface 22 within a bevel adjustment range R (best illustrated in FIG. 3) of from about 90 degrees (blade 24 perpendicular to the work surface 22) to about 45 degrees relative to the work surface 22 (blade position depicted in phantom lines in FIG. 3) on the housing 12.

Figure 3:
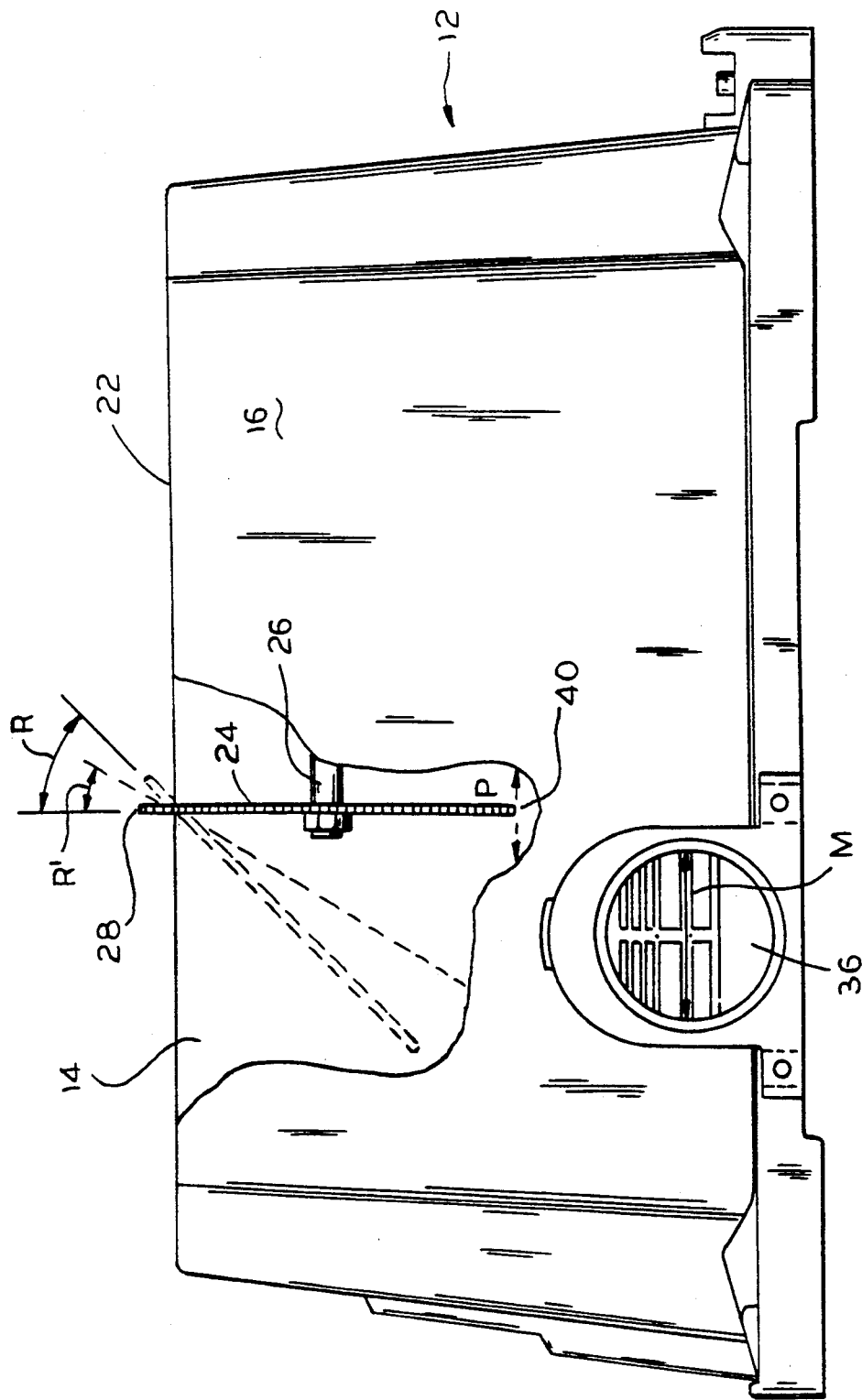
FIG. 3 is a rear elevational view of the housing of FIG. 2 with the housing partially cut away to show the relative vertical relationship of the saw blade and the guard member and outlet port.

As best illustrated in FIG. 3, an outlet port 36 is positioned in the rear wall 16 of the housing 12 adjacent a lower extremity 28 of the rear wall 16 with the midline M of the outlet port 36 lying on or below an imaginary tangential plane P extending essentially parallel to the planar work surface 22 from the lower periphery 40 of the 10 inch diameter circular blade 24 mounted within the housing 12. The outlet port 36 lies longitudinally of said rear wall 16 within an angular region corresponding to a projection of the bevel adjustment range R of the blade 24 onto the rear wall 16 and, in a preferred embodiment of this invention, is positioned in an angular region R' of from 90 degrees to 60 degrees relative to the work surface 22. The outlet port 36 as shown in FIGS. 2 and 5 is in operative engagement with an exhaust system 42 including a vacuum pipe or line 44 and a standard vacuum pump (not shown).

The power table saw 10 also includes a guard device 46 which projects inwardly from the outlet port 36 into the interior of the housing 12 to prevent insertion of extraneous matter such as the operator's appendages and like items into the interior of the housing while protecting the outlet port 36 from clogging as a result of removal of saw dust and other debris from the interior of the housing through the outlet port 36 and via operation of the exhaust system 42.

As best illustrated in FIGS. 2, 4 and 5, the guard device 46 has openings 48 therein with the total area of these openings being greater than 100% of the area of the outlet port 36 and, preferably, greater than 125% of the area of the outlet port and, most preferably, greater than 150% thereof. Each of the openings 48 in the guard device 46 has a minor dimension m (shown in FIG. 5) not greater than about $\frac{3}{4}$ inch with the openings being dimensioned on the basis of straight line distances d from the closest peripheral edge 50 of the blade 24 mounted in the housing 12 to the openings 48 so that the minor dimension m of the openings is not greater than $\frac{1}{4}$ inch when the straight line distance d from the edge 50 to the openings 48 is up to $\frac{1}{2}$ inch, the minor dimension m of the openings 48 is not greater than about $\frac{3}{8}$ inch when the straight line distance d from the edge 50 to the openings 48 is between $\frac{1}{2}$ and $1\frac{1}{2}$ inches, the minor dimension m of the openings 48 is not greater than about $\frac{1}{2}$ inch when the straight line distance d from the edge 50 to the openings 48 is between $1\frac{1}{2}$ and $2\frac{1}{2}$ inches and the minor dimension m of the openings 48 is not greater than $\frac{3}{4}$ inch when the straight line distance d from the edge to the openings 48 is between $2\frac{1}{2}$ and $4\frac{1}{2}$ inches. As employed herein, the term "minor dimension" means the smallest measurement defining an edge or other dimension of the various configurations which may characterize the shape of the openings (i.e., the smallest edge of a rectangle or a conic section or the smallest cross-sectional line through an oval, ellipse and the like).

Accordingly, the present invention provides an improved system for removal of dust and other debris from the power tool than has been provided heretofore. As a result of the construction of the present devices and, particularly, the relative placement of the outlet and the cutting member as well as the configuration and structure of the protective guard member, a safer and more efficient and effective device is provided herein. It is to be noted further that the present construction avoids the requirement for internal sub-housings within the main housing to accommodate the cutting member since such constructions have been found to present particular problems in use as a result of the accumulation of debris within the sub-housing which tends to overflow into the main housing and cause waste collection problems.

Although the invention has been described in its preferred form with a certain degree of particularity, it is to be understood that the present disclosure has been made by way of example only. Numerous changes in the details and construction of the combination and arrangement of parts will be apparent without departing from the spirit and scope of the invention, as defined in the appended claims.

We claim:

1. A power table tool comprising:
   a housing having spaced front and rear walls sealingly interconnected by spaced side walls, said housing sealingly engaging and supporting a slotted, substantially planar work surface on the upper extremity of said walls,
   a rotatable, circular cutting member mounted within said housing beneath said planar work surface, said circular cutting member being positioned transverse to said front and rear walls with the upper periphery of said member projecting outwardly from said housing through a slot in said slotted work surface to engage a workpiece positioned on said work surface, said cutting member being mounted for selective angular displacement in said slot within a bevel adjustment range of from about 90 degrees to about 45 degrees relative to said work surface, an outlet port adapted for operative engagement with exhaust means, said port being positioned in said rear wall of said housing adjacent a lower extremity of said rear wall with a midpoint of said outlet port not being disposed above an imaginary tangential plane extending from the lower periphery of said circular cutting member mounted within said housing, said outlet port being positioned in said rear wall within an angular region corresponding to a projection of said bevel adjustment range of said cutting member onto the rear wall, and a guard means projecting inwardly from said outlet port into the interior of said housing to prevent insertion of extraneous matter into the interior of the housing while protecting said outlet port from clogging as a result of removal of saw dust and other debris from the interior of the housing through said outlet port and said exhaust means, said guard means being structured and dimensioned to provide openings therein, the total area of said openings being greater than 100% of the area of the outlet port and each of said openings having a minor dimension not greater than about 3 inches, said openings in said guard means being further dimensioned on the basis of straight line distances from the closest peripheral edge of said cutting member mounted in said housing to said openings so that the minor dimension of said openings is not greater than ¼ inch when said straight line distance from said edge to said openings is up to about ½ inch, the minor dimension of said openings is not greater than about ⅜ inch when said straight lien distance from said edge to said openings is ½ inch up to about 1½ inches, the minor dimension of said openings is not greater than about ½ inch when said straight line distance from said edge to said openings is 1½ inches up to about 2½ inches and the minor dimension of said openings is not greater than ¾ when said straight line distance from said edge to said openings is 2½ inches up to about 4½ inches.

2. The power table tool of claim 1 wherein said tool is a saw and said outting member is a saw blade.

3. The power table tool of claim 2 wherein said outlet port is connected to a vacuum line and said exhaust means is a vacuum system for removing said sawdust and other debris from the interior of the housing.

4. The power table tool of claim 2 wherein said saw blade is interchangeably mounted within said housing.

5. The power table tool of claim 2 including an adjustment lever for providing said selected angular displacement of said saw blade in said slot.

6. The power table tool of claim 1 wherein said bevel adjustment range is from 90 degrees to 60 degrees.

7. The power table tool of claim 1 wherein said outlet port is circular in cross-section.

8. The power table tool of claim 1 wherein said guard means includes rectangular-shaped openings therein.

9. The power table tool of claim 1 wherein said openings in said guard means have larger minor dimensions at a bottom of said guard means furthest from said cutting member than the openings in said guard means at an upper side thereof at a closer distance to said cutting member.

* * * * *